United States Patent
Finlayson et al.

(10) Patent No.: US 8,436,089 B2
(45) Date of Patent: May 7, 2013

(54) POLYPROPYLENE COMPOSITION, A METHOD OF PRODUCING THE SAME, AND ARTICLES MADE THEREFROM

(75) Inventors: Malcolm F. Finlayson, Houston, TX (US); Brian W. Walther, Clute, TX (US); Todd A. Hogan, Sanford, MI (US); Stephen M. Hoenig, Lake Jackson, TX (US); Kim L. Walton, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 325 days.

(21) Appl. No.: 12/532,346

(22) PCT Filed: Feb. 27, 2008

(86) PCT No.: PCT/US2008/055057
§ 371 (c)(1),
(2), (4) Date: Sep. 21, 2009

(87) PCT Pub. No.: WO2008/121464
PCT Pub. Date: Oct. 9, 2008

(65) Prior Publication Data
US 2010/0048792 A1   Feb. 25, 2010

Related U.S. Application Data

(60) Provisional application No. 60/920,982, filed on Mar. 30, 2007.

(51) Int. Cl.
*C08K 3/26* (2006.01)
*C08K 3/00* (2006.01)

(52) U.S. Cl.
USPC .......................... 524/425; 524/427

(58) Field of Classification Search .......... 524/425
See application file for complete search history.

(56) References Cited

U.S. PATENT DOCUMENTS

| | | | |
|---|---|---|---|
| 5,414,027 A | 5/1995 | DeNicola, Jr. et al. | |
| 6,153,715 A | 11/2000 | Nakamura et al. | |
| 6,300,419 B1 | 10/2001 | Sehanobish et al. | |
| 6,472,473 B1 | 10/2002 | Ansems et al. | |
| 6,734,253 B2 | 5/2004 | Krabbenborg et al. | |
| 6,784,252 B2 * | 8/2004 | Ramanathan et al. | 525/240 |
| 2002/0151611 A1 * | 10/2002 | Thoen et al. | 521/142 |
| 2005/0070673 A1 * | 3/2005 | Novak et al. | 525/333.9 |
| 2005/0154136 A1 | 7/2005 | Dharia et al. | |
| 2005/0176892 A1 | 8/2005 | Weaver et al. | |
| 2005/0209403 A1 | 9/2005 | Walton et al. | |
| 2005/0272858 A1 * | 12/2005 | Pierini et al. | 524/543 |

OTHER PUBLICATIONS

International Search Report (PCT/US2008/055057).

* cited by examiner

*Primary Examiner* — Hui Chin

(57) ABSTRACT

The instant invention is a polypropylene composition, a method of producing the same, and articles made therefrom. The polypropylene composition according to instant invention includes the reactive melt blending product of a high crystalline polypropylene having a crystallinity of at least 64 percent, an elastomer, a coupling agent, and optionally a filler. The polypropylene composition according to instant invention has a melt flow rate in the range of less than 1 g/10 minutes measured at 230° C. under a load of 2.16 kg in accordance with ASTM-D 1238.

11 Claims, 5 Drawing Sheets

POLYPROPYLENE COMPOSITION, A METHOD OF PRODUCING THE SAME, AND ARTICLES MADE THEREFROM

CROSS-REFERENCE TO RELATED APPLICATIONS

This application is a non-provisional application claiming priority from the U.S. Provisional Patent Application No. 60/920,982, filed on Mar. 30, 2007, entitled "POLYPROPYLENE COMPOSITION, A METHOD OF PRODUCING THE SAME, AND ARTICLES MADE THEREFROM," the teachings of which are incorporated by reference herein, as if reproduced in full hereinbelow.

FIELD OF INVENTION

The instant invention relates to a polypropylene composition, a method of producing the same, and articles made therefrom.

BACKGROUND OF THE INVENTION

The use of polypropylene polymers in thermoforming applications is generally known. Polypropylene polymers are typically formed into a sheet, for example, via extrusion process. The sheet is then fabricated into an article via thermoforming process. In general, the thermoforming process includes heating a sheet until it softens or starts to sag, after which one or more of vacuum, air pressure, and/or mechanical draw assist is applied and the heated sheet is drawn into a female mold, sometimes referred to as die, drawn over a male mold, or the two molds are used together to form an article, the formed article is cooled, removed from the mold, and trimmed as necessary. Thermoforming process may, for example, be employed to fabricate automobile parts. Many such automobile parts, particularly large parts, can conceivably be made by thermoforming provided the polymer has adequate processing properties such as high melt strength and end product properties such as stiffness and toughness, especially at low temperatures.

U.S. Pat. No. 6,472,473 discloses injection molded automotive articles comprising a coupled propylene polymer composition and optionally a thermoplastic elastomer, a thermoplastic polymer and a filler.

U.S. Pat. No. 6,734,253 discloses a composition comprising a coupled impact propylene copolymer. Preferably, the coupled impact propylene copolymer has an elastomeric phase that is present in an amount of at least 9 weight percent of the coupled propylene copolymer. Articles formed from the coupled propylene copolymer exhibit improved directionally balanced impact properties as compared with articles formed from comparable non-coupled impact propylene copolymers and also exhibit improved ductile-to-brittle transition temperatures compared with comparable non-coupled impact propylene copolymers.

U.S. Pat. No. 6,300,419 discloses a propylene polymer composition comprising from about 55 to about 80 parts by weight of a high crystalline isotactic propylene polymer having a crystalline phase determined by differential scanning calorimetry equal to or greater than about 62 weight percent based on the weight of the high crystalline propylene polymer; from about 20 to about 45 parts by weight of a substantially linear ethylene polymer, a linear ethylene polymer or combinations thereof wherein the substantially linear ethylene polymer and linear ethylene polymer are characterized as having a density of less than about 0.93 g/cm$^3$, a molecular weight distribution, Mw/Mn, of less than about 3.0, and a Composition Distribution Branch Index of greater than 30 percent; from 0 to about 50 parts by weight of a filler; and from 0 to about 15 parts by weight of an additional polymer, based on the weight of the total composition.

U.S. Pat. No. 6,153,715 discloses a propylene resin composition composed of a nucleating agent and a propylene resin. Blow-molding of the propylene resin composition provides a blow-molded article which is advantageously used as, particularly, a large-sized automobile part, such as a bumper, a bumper beam, a seat back, an instrument panel, or a like part.

U.S. Pat. No. 5,414,027 discloses a normally solid, high molecular weight, non-linear, substantially gel-free, propylene polymer material, and a process for making the polymer material by high energy radiation of a normally solid, high molecular weight, linear, propylene polymer in a reduced active oxygen environment, maintaining the irradiated material in such environment for a specific period of time, and then deactivating free radicals in the material.

U.S. Patent Application Publication No. 2005/0154136 discloses a thermoplastic olefin (TPO) composition comprising (1) a major amount by weight of (a) a substantially linear homopolymer or copolymer of a $C_2$—$C_{10}$ alpha-olefin in major proportion to (b) a long chain branched a linear homopolymer or copolymer of a $C_2$—$C_{10}$ alpha-olefin, (2) a minor amount by weight of a cross linkable elastomer, and (3) at least one thermally decomposing free radical generating agent present in an amount sufficient to promote an increase in melt strength of the composition over that of the melt strength of the linear homopolymer or copolymer of a $C_2$—$C_{10}$ alpha-olefin alone and insufficient to substantially degrade the alpha-olefinic polymers. The TPO composition is prepared by melt blending the components at a temperature sufficient to melt said homopolymers or copolymers of a $C_2$—$C_{10}$ alpha-olefin and thermally decompose said agent. Articles are thermoformed from the thermoplastic olefin.

U.S. Patent Application Publication No. 2005/0070673 discloses thermoformed articles comprising a coupled propylene polymer composition.

U.S. Patent Application Publication No. 2005/0176892 discloses thermoplastic olefinic compositions comprising (a) at least one ethylene/alpha-olefin polymer having a PRR between 8 and 70 and (b) at least one polypropylene polymer and an (a)/(b) weight ratio of greater than 50/less than 50 to 90/10. The compositions are used in extrusion, calendering, blow molding, foaming and thermoforming processes to make a variety of articles, such as automotive instrument panel skins.

U.S. Patent Application Publication No. 2005/0209403 discloses thermoplastic olefinic compositions comprising (a) at least one ethylene/alpha-olefin polymer having a PRR between 8 and 70 and (b) at least one polyolefin polymer selected from the group of polyethylene homopolymers and alpha-olefin interpolymers having a PRR less than 4, ethylene/acrylic acid copolymers, ethylene/vinyl acetate copolymers, and styrenic/olefinic block interpolymers and an (a)/(b) weight ratio of greater than 50/less than 50 to 90/10. The compositions are used in extrusion, calendaring, blow molding, foaming and thermoforming processes to make a variety of articles, such as automotive instrument panel skins.

U.S. Patent Application Publication No. 2005/0272858 discloses a polypropylene resin which has a $M_w/M_n$ of less than 5, a melt flow rate of less than 7 g/10 minutes, a 1 percent secant flexural modulus of greater than 300,000 psi and less than 2 weight percent xylene solubles.

Despite the research efforts in developing polypropylene compositions suitable for thermoforming, there is still a need for a polypropylene composition having adequate processing properties such as high melt strength and improved end product properties such as stiffness and toughness, especially at low temperatures.

SUMMARY OF THE INVENTION

The instant invention is a polypropylene composition, a method of producing the same, and articles made therefrom. The polypropylene composition according to instant invention includes the reactive melt blending product of a high crystalline polypropylene having a crystallinity of at least 64 percent, an elastomer, a coupling agent, and optionally a filler. The polypropylene composition according to instant invention has a melt flow rate in the range of less than 1 g/10 minutes measured at 230° C. under a load of 2.16 kg in accordance with ASTM-D 1238. The method of producing a polypropylene composition according to instant invention includes the following steps: (1) reactive melt blending a high crystalline polypropylene having a crystallinity of at least 64 percent, an elastomer, and optionally a filler in the presence of a coupling agent; and (2) thereby producing the polypropylene composition having a melt flow rate in the range of less than 1 g/10 minutes measured at 230° C. under a load of 2.16 kg in accordance with ASTM-D 1238. The articles according to instant invention include the inventive polypropylene composition including the reactive melt blending product of a high crystalline polypropylene having a crystallinity of at least 64 percent, an elastomer, a coupling agent, and optionally a filler.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
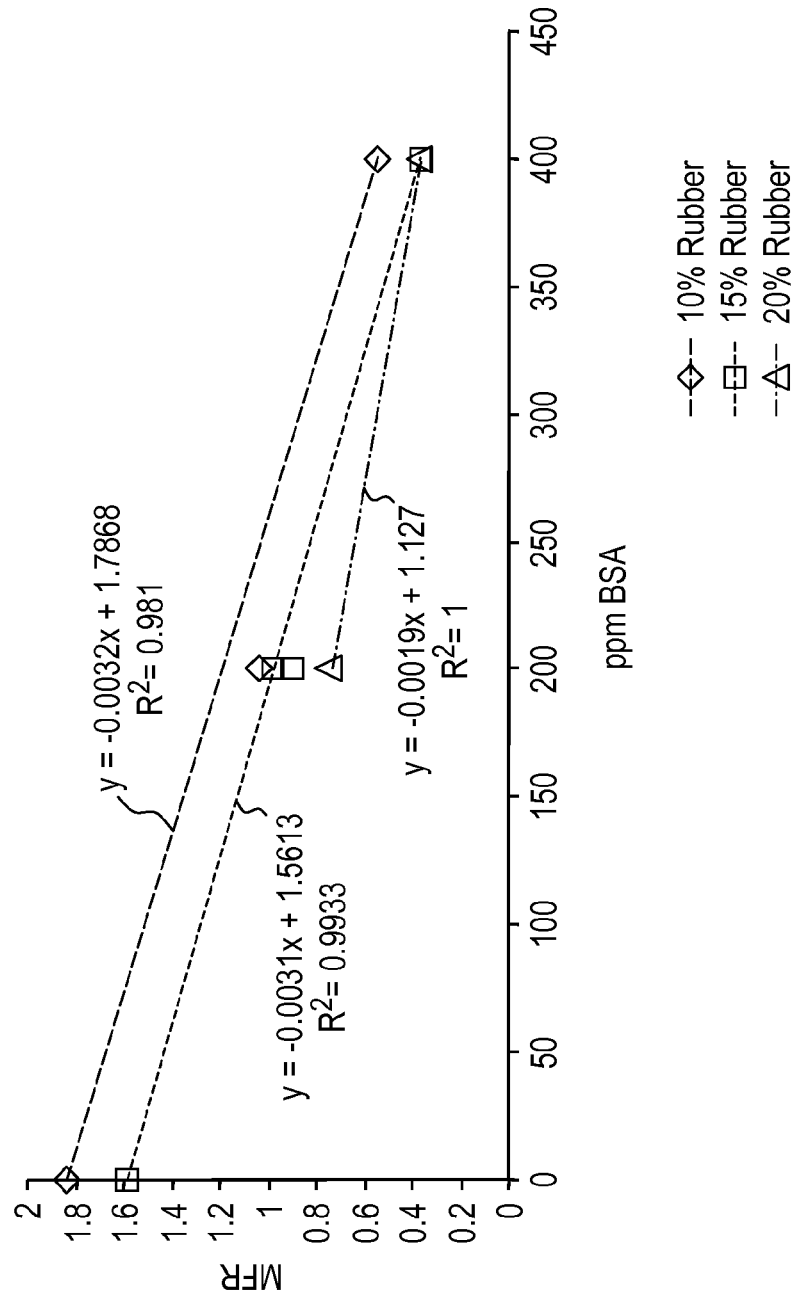
FIG. 1 is a graph illustrating the melt flow rate of the polypropylene compositions according to instant invention including 10, 15, and 20 percent by weight of an elastomer as a function of the amount of the coupling agent utilized to make the polypropylene compositions.
Figure 2:
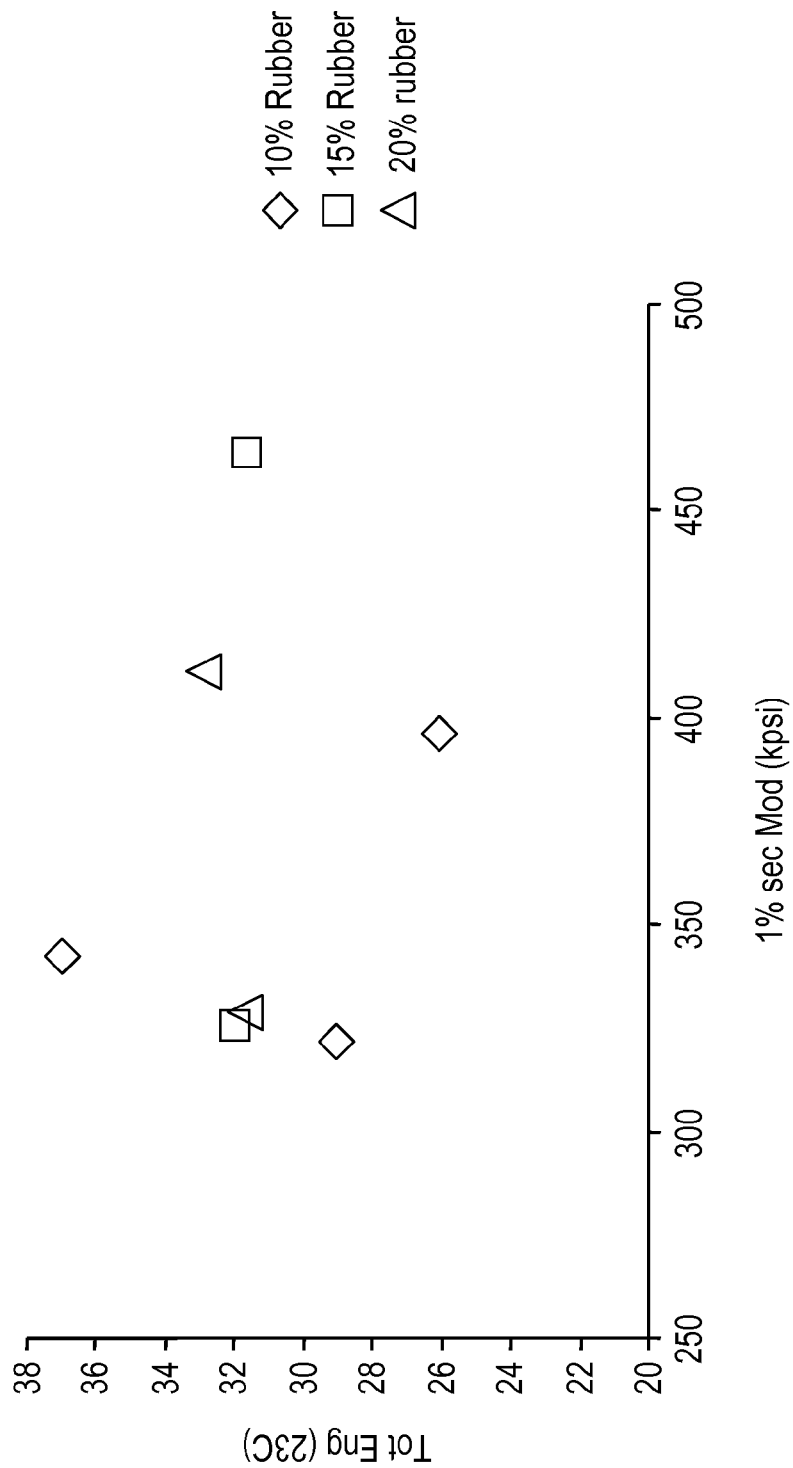
FIG. 2 is a graph illustrating the total energy absorbed at 23° C. by the polypropylene compositions according to instant invention including 10, 15, and 20 percent by weight of an elastomer as a function of 1% secant modulus.
Figure 3:
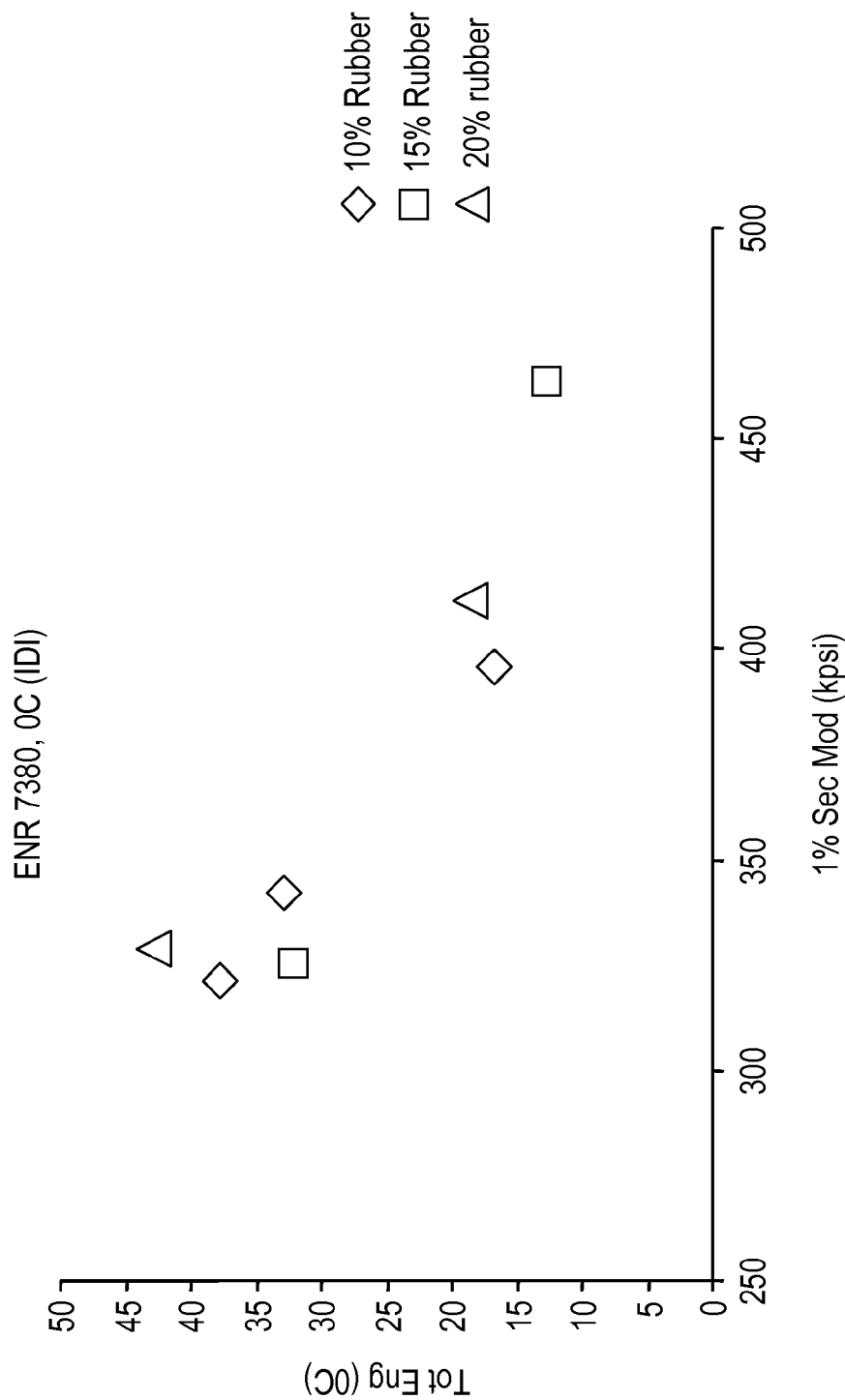
FIG. 3 is a graph illustrating the total energy absorbed at 0° C. by the polypropylene compositions according to instant invention including 10, 15, and 20 percent by weight of an elastomer as a function of 1% secant modulus.
Figure 4:
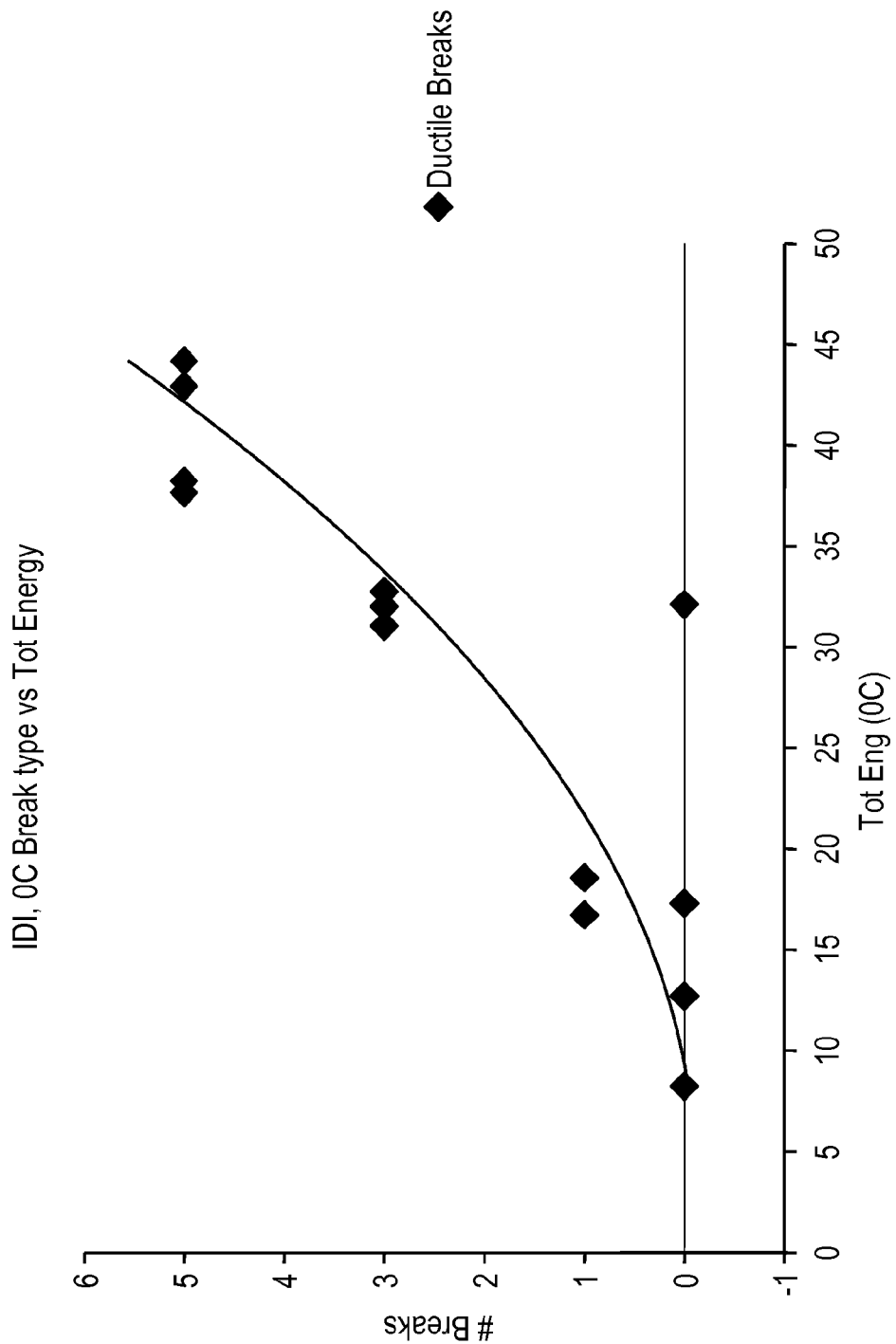
FIG. 4 is a graph illustrating the number of ductile breaks of the polypropylene compositions according to instant invention as a function of the total energy absorbed at 0° C. by the polypropylene compositions according to instant invention.

The instant invention is a polypropylene composition, a method of making the same, and articles made therefrom.

The polypropylene composition according to instant invention includes the reactive melt blending product of a high crystalline polypropylene having a crystallinity of at least 64 percent, an elastomer, a coupling agent, and optionally a filler. The polypropylene composition may further include a nucleating agent or one or more additives.

The polypropylene composition according to instant invention may have an instrumented dart impact in the range of at least 20 inch-lb as measured by the total energy absorbed at a temperature in the range of equal or less than 23° C., as measured in accordance with ASTM-D 376; or in the alternative, it may have an instrumented dart impact in the range of at least 10 inch-lb as measured by the total energy absorbed at a temperature in the range of equal or less than 0° C., as measured in accordance with ASTM-D 376; or in the alternative, it may have an instrumented dart impact in the range of at least 10 inch-lb as measured by the total energy absorbed at a temperature in the range of equal or less than −10° C., as measured in accordance with ASTM-D 376; or in the alternative, it may have an instrumented dart impact in the range of at least 10 inch-lb as measured by the total energy absorbed at a temperature in the range of equal or less than −30° C., as measured in accordance with ASTM-D 376; or in the alternative, it may have an instrumented dart impact in the range of at least 10 inch-lb as measured by the total energy absorbed at a temperature in the range of equal or less than −40° C., as measured in accordance with ASTM-D 376. The polypropylene composition may have a flexural modulus of at least 300,000 psi, as measured in accordance with ASTM-D 790A. All individual values and subranges of at least 300,000 psi are included herein and disclosed herein; for example, the polypropylene composition may a have a flexural modulus of at least 400,000 psi, as measured in accordance with ASTM-D 790A; or in the alternative, the polypropylene composition may a have a flexural modulus of at least 500,000 psi, as measured in accordance with ASTM-D 790A. The polypropylene composition may have a melt flow rate in the range of less than 1 g/10 minutes measured at 230° C. under a load of 2.16 kg in accordance with ASTM-D 1238. All individual values and subranges less than 1 g/10 minutes are included herein and disclosed herein; for example, the polypropylene composition may have a melt flow rate in the range of 0.25 to 0.65 g/10 minutes measured at 230° C. under a load of 2.16 kg in accordance with ASTM-D 1238.

The high crystalline polypropylene component may, for example, have a percent crystallinity of equal to or greater than 64 percent, measured by Differential Scanning Calorimetry ("DSC"). All individual values and subranges equal to or greater than 64 percent are included herein and disclosed herein; for example, the high crystalline polypropylene component may have a percent crystallinity of equal to or greater than 68 percent; or in the alternative, the high crystalline polypropylene component may have a percent crystallinity of equal to or greater than 70 percent. The high crystalline polypropylene component may, for example, have a melt flow rate ("MFR") in the range of less than 35 g/10 minutes measured at 230° C. under a load of 2.16 kg in accordance with ASTM-D 1238. All individual values and subranges less than 35 g/10 minutes are included herein and disclosed herein; for example, the high crystalline polypropylene component may have a melt flow rate in the range of less than 10 g/10 minutes measured at 230° C. under a load of 2.16 kg in accordance with ASTM-D 1238; or in the alternative, the high crystalline polypropylene component may, for example, have a melt flow rate of less than 7 g/10 minutes measured at 230° C. under a load of 2.16 kg in accordance with ASTM-D 1238; or in the alternative, the high crystalline polypropylene component may, for example, have a melt flow rate of less than 5 g/10 minutes measured at 230° C. under a load of 2.16 kg in accordance with ASTM-D 1238. The high crystalline polypropylene component may, for example, have a crystallization temperature of greater than 130° C. All individual values and subranges greater than 130° C. are included herein and disclosed herein; for example, the high crystalline polypropylene component may have a crystallization temperature of greater than 135° C. The high crystalline polypropylene component may, for example, have an isotactic pentad/triad ration of greater 95 percent. All individual values and subranges greater than 95 percent included herein and disclosed herein; for example, the high crystalline polypropylene component may, have an isotactic pentad/triad ration of greater 96 percent; or in the alternative, the high crystalline polypropylene component may, for example, have an isotactic pentad/triad ration of greater 97 percent. The polypropylene composition may comprise less than 90 percent by weight of the high crystalline polypropylene component based on the total weight of the polypropylene composition. All individual values and subranges less than 90 weight percent are included herein and disclosed herein; for example, polypropylene composition may comprise 50 to 80 percent by weight of the high crystalline polypropylene component based on the total weight of the polypropylene composition; or in the alternative, polypropylene composition may, for example, comprise 50 to 70 percent by weight of the high crystalline polypropylene component based on the total weight of the polypropylene composition.

The high crystalline polypropylene component may be a polypropylene homopolymer, a polypropylene interpolymer, as well as reactor copolymers of polypropylene, which can contain about 1 to about 20 weight percent ethylene or an α-olefin comonomer of 4 to 20 carbon atoms.

The high crystalline polypropylene interpolymer can be a random or block copolymer, or a propylene-based terpolymer. Exemplary comonomers for polymerizing with propylene include, but are not limited to, ethylene, 1-butene, 1-pentene, 1-hexene, 1-heptene, 1-octene, 1-nonene, 1-decene, 1-unidecene, 1dodecene. The high crystalline polypropylene interpolymer may comprise less than 10 percent by weight of one or more comonomers based on the total weight of the high crystalline polypropylene interpolymer. All individual values and subranges less than 10 weight percent are included herein and disclosed herein; for example, the high crystalline polypropylene interpolymer may comprise less than 5 percent by weight of one or more comonomers based on the total weight of the high crystalline polypropylene interpolymer; or in the alternative, the high crystalline polypropylene interpolymer may comprise less than 2 percent by weight of one or more comonomers based on the total weight of the high crystalline polypropylene interpolymer.

The high crystalline polypropylene component can be prepared by various processes, for example, in a single stage or multiple stages, by such polymerization method as slurry polymerization, liquid pool process, gas phase polymerization, bulk polymerization, solution polymerization or a combination thereof using a metallocene catalyst or a so-called Ziegler-Natta catalyst, which usually is one comprising a solid transition metal component comprising titanium. Particularly a catalyst consisting of, as a transition metal/solid component, a solid composition of titanium trichloride which contains as essential components titanium, magnesium and a halogen; as an organometalic component an organoaluminum compound; and if desired an electron donor. Preferred electron donors are organic compounds containing a nitrogen atom, a phosphorous atom, a sulfur atom, a silicon atom or a boron atom, and preferred are silicon compounds, ester compounds or ether compounds containing these atoms. High crystalline polypropylene component may be made by catalytically reacting propylene in a polymerization reactor with appropriate molecular weight control agents. Nucleating agent may be added after the reaction is completed in order to promote crystal formation. The polymerization catalyst should have high activity and be capable of generating highly tactic polymer. The reactor system must be capable of removing the heat of polymerization from the reaction mass, so the temperature and pressure of the reaction can be controlled appropriately. In general, the high crystalline polypropylene is in the isotactic form, although other forms can also be used (e.g., syndiotactic or atactic). The high crystalline polypropylene used for the present invention is a propylene homopolymer or a propylene copolymer of propylene and an alpha-olefin, e.g. a $C_2$, or $C_4$ to $C_{20}$ alpha-olefin, for example, a random or block copolymer.

The elastomer component may, for example, be any elastomer. Elastomers are defined as materials which experience large reversible deformations under relatively low stress. Elastomers are typically characterized as having structural irregularities, non-polar structures, or flexible units in the polymer chain. An elastomeric polymer may, for example, be stretched to at least twice its relaxed length with stress and after release of the stress returns to approximately the original dimensions and shape. Some examples of commercially available elastomers include natural rubber, polyolefin elastomers (POE), chlorinated polyethylene (CPE), silicone rubber, styrene/butadiene (SB) copolymers, styrene/butadiene/styrene (SBS) terpolymers, styrene/ethylene/butadiene/styrene (SEBS) terpolymers and hydrogenated SBS or SEBS.

Preferred elastomers are polyolefin elastomers. Suitable polyolefin elastomers for use in the present invention comprise one or more $C_2$ to $C_{20}$ alpha-olefins in polymerized form, having a glass transition temperature ($T_g$) of less than 25° C., preferably less than 0° C. $T_g$ is the temperature or temperature range at which a polymeric material shows an abrupt change in its physical properties, including, for example, mechanical strength. $T_g$ can be determined by differential scanning calorimetry. Exemplary polyolefin elastomers include, but are not limited to, ethylene/alpha-olefin copolymers and terpolymers and block copolymers, ethylene-propylene diene rubbers, propylene-alpha olefin copolymers, silicon rubbers, butadiene-based rubber and the like. Polyolefin elastomer may, for example, include ethylene/alpha-olefin copolymers, made with single-site or metallocene catalysts, wherein the units within the polyolefin elastomer derived from ethylene are greater than 50 percent by weight and the alpha-olefin is selected from olefins having at least three carbon atoms; or in the alternative, the alpha-olefin is selected from olefins having at least four carbon atoms; or in another alternative, the alpha-olefin is selected from olefins having at from 4 to 20 carbon atoms; or in another alternative, the alpha-olefin is selected from olefins having from 4 to 12 carbon atoms; or in another alternative, the alpha-olefin is selected from olefins having at from 4 to 8 carbon atoms. Exemplary alpha-olefins include, but are not limited to, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene. The elastomer component may have a density in the range of 0.855 to 0.980 g/cm$^3$. All individual values and subranges from 0.855 to 0.980 g/cm³ are included herein and disclosed herein; for example, the elastomer component may have a density in the range of 0.870 to 0.940 g/cm³; or in the alternative, the elastomer component may have a density in the range of 0.875 to 0.940 g/cm³. The elastomer component may further have a melt index ($I_2$), for example, in the range of 0.1 to 100 g/10 minutes. All individual values and subranges from 0.1 to 100 g/10 minutes are included herein and disclosed herein; for example, the elastomer component may have a melt index ($I_2$) in the range of 0.1 to 30 g/10 minutes; or in the alternative, the elastomer component may have a melt index ($I_2$) in the range of 0.1 to 10 g/10 minutes; or in the alternative, the elastomer component may have a melt index ($I_2$) in the range of 0.1 to 2 g/10 minutes. The polypropylene composition may comprise less than 50 percent by weight of the elastomer component based on the weight of the polypropylene composition. All individual values and subranges less than 50 weight percent are included herein and disclosed herein; for example, polypropylene composition may comprise less than 20 percent by weight of the elastomer component based on the weight of the polypropylene composition; or in the alternative, polypropylene composition may comprise 10 to 20 percent by weight of the elastomer component based on the weight of the polypropylene composition.

In one embodiment, the polyolefin elastomer is one or more substantially linear ethylene polymer or one or more linear ethylene polymer (S/LEP), or a mixture of one or more of each. Both substantially linear ethylene polymers and linear ethylene polymers are well known. Substantially linear ethylene polymers and their method of preparation are fully described in U.S. Pat. Nos. 5,272,236 and 5,278,272 and linear ethylene polymers and their method of preparation are fully disclosed in U.S. Pat. Nos. 3,645,992; 4,937,299; 4,701,432; 4,937,301; 4,935,397; 5,055,438; EP 129,368; EP 260,999; and WO 90/07526, the disclosures of which are incorporated herein by reference.

The term coupling agent, as used herein, refers to a chemical compound that contains at least two reactive groups that are each capable of forming a carbene or nitrene group that are capable of inserting into the carbon hydrogen bonds of aliphatic, CH, CH2, or CH3 groups, and also aromatic CH groups, of a polymer chain. The reactive groups together can couple polymer chains. It may be necessary to activate a coupling agent with heat, sonic energy, radiation, or other chemical activating energy, for the coupling agent to be effective for coupling polymer chains. Examples of chemical compounds that contain a reactive group capable of forming a carbene group include, but are not limited, for example, diazo alkanes, geminally-substituted methylene groups, and metallocarbenes. Examples of chemical compounds that contain reactive groups capable of forming nitrene groups, include, but are not limited to, phosphazene azides, sulfonyl azides, formyl azides, and azides. The polypropylene composition may comprise 200 to 1000 parts by weight of the coupling agent per one million parts of the polypropylene composition. All individual values and subranges from 200 to 1000 parts per million are included herein and disclosed herein; for example, the polypropylene composition may comprise 400 to 800 parts by weight of the coupling agent per one million parts of the polypropylene composition; or in the alternative, the polypropylene composition may comprise 400 to 600 parts by weight of the coupling agent per one million parts of the polypropylene composition. Exemplary coupling agents include, but are not limited to, poly(sulfonyl azide), and a bis(sulfonyl azide). Examples of poly(sulfonyl azides) are further described in WO 99/10424. Exemplary poly(sulfonyl azide)s include, but are not limited to, 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from 2 to 5 sulfonyl azide groups per molecule, and mixtures thereof. In the alternative, exemplary poly(sulfonyl azide)s include, but are not limited to, oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof. The coupling agent may, for example, be 4,4'-diphenyl oxide bis-sulfonyl azide, commercially available from dynamit noble.

Sulfonyl azides are commercially available or are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used.

Sulfonyl azides and other azides can, however, be shock sensitive. It may be necessary to phlagmatize the azides or to otherwise protect the azides from reaction during the manufacture and processing of the azide, or the shipping and handling of the azide. Phlagmatizing, as used herein, refers to methods for reducing the shock sensitivity of a chemical or chemical species by mixing or combining the reactive chemical with an inert or less reactive chemical. For example, an antioxidant and a coupling agent may be blended together to form a molecular melt, and that the formation of this molecular melt can phlagmatize the coupling agent.

The term molecular melt, as used herein, refers to blend of a coupling agent and an antioxidant, optionally also containing other polymer additives. The coupling agent and the antioxidant form a complex where the Raman spectra relating to the groups forming the nitrene groups are shifted compared to the Raman spectra exhibited by the groups forming the nitrene groups of the coupling agent alone.

The term antioxidant, as used herein, refers to types or classes of chemical compounds that are capable of being used to minimize the oxidation that can occur during the processing of polymers. The term antioxidant also includes chemical derivatives of the antioxidants, including hydrocarbyls. The term antioxidant further includes chemical compounds, which when properly combined with the coupling agent, interact therewith to form a complex that exhibits a modified Raman spectra compared to the coupling agent alone. Preferably, the antioxidant is not a phosphite-containing compound or a compound containing a phosphorous in the +3 oxidation state. An example of a phosphite-based antioxidant is Tris(2,4-di-tert-butylphenyl)phosphite, commercially available from Ciba Specialty Chemicals Company under the trade name Irgafos® 168.

Exemplary classes of antioxidants include, but are not limited to, compounds that can function as either carbon radical and/or oxygen radical scavengers, such as, phenolic compounds and derivatives thereof, hindered amines, amine hydroxides, thioester compounds, and hindered phenolic compounds. Additionally, lactones may be used an antioxidant. The molecular melt may contain one or more antioxidants.

Exemplary phenolic-based antioxidants and substituted phenolic-based antioxidants include, but are not limited to, 2,2'-methylene bis(6-(1-methylcyclohexyl)-p-cresol and 2,6-ditertiary butyl-4-methyl phenol.

Exemplary hindered phenolic compounds include, but are not limited to, 3,5-di-tert-butyl-4-hydroxy hydrocinnamate, commercially available from Ciba Specialty Chemicals Company, under the trade name Irganox® 1010.

Exemplary lactones include, but are not limited to, 5,7-bis (1,1-dimethylethyl)-3-hydroxy-2(3H)-benzofuranone reaction products with o-xylene, commercially available from Ciba Specialty Chemicals Company, under the trade name Irganox® HP-136.

The molecular melt composition includes an antioxidant, and a coupling agent. At least a portion of the coupling agent and antioxidant present in the molecular melt form a complex, which does not adversely interfere with the utilization of the coupling agent for modifying polymers. The mole ratio of coupling agent to antioxidant in the molecular melt may be from 1:10 to 10:1. All individual values and subranges from 1:10 to 10:1 are included herein and disclosed herein; for example, the mole ratio of coupling agent to antioxidant may be from 1:2 to 8:1; or in the alternative, the mole ratio of coupling agent to antioxidant may be from 1:1 to 4:1. The molecular melt may comprise less than 99 percent by weight of the coupling agent, based on the weight of the molecular melt. All individual values and subranges less than 99 weight percent are included herein and discloses herein; for example, the molecular melt may comprise less than 75 percent by weight of the coupling agent, based on the weight of the molecular melt; or in the alternative, the molecular melt may comprise less than 50 percent by weight of the coupling agent, based on the weight of the molecular melt; or in the alternative, the molecular melt may comprise less than 35 percent by weight of the coupling agent, based on the weight of the molecular melt; or in the alternative, the molecular melt may comprise less than 25 percent by weight of the coupling agent, based on the weight of the molecular melt. The molecular melt may comprise at least 1 percent by weight of the antioxidant, based on the weight of the molecular melt. All individual values and subranges of at least 1 weight percent are included herein and discloses herein; for example, the molecular melt may comprise at least 25 percent by weight of the antioxidant, based on the weight of the molecular melt; or in the alternative, the molecular melt may comprise at least 50 percent by weight of the antioxidant, based on the weight of the molecular melt; or in the alternative, the molecular melt may comprise at least 65 percent by weight of the antioxidant, based on the weight of the molecular melt; or in the alternative, the molecular melt may comprise at least 75 percent by weight of the antioxidant, based on the weight of the molecular melt.

The molecular melt may be formed by melt blending the coupling agent and antioxidant, by co-precipitating the coupling agent and antioxidant from a common solvent, or any other conventional method. The molecular melt may be formed into any convenient form, i.e. solid or liquid.

Other compounds, in addition to the coupling agent and antioxidant, may optionally be present in the molecular melt. Preferably, the additional compounds will not adversely react with either the coupling agent or the antioxidant and will not cause the crystallinity of the molecular melt to rise significantly.

Exemplary additional compounds include, but are not limited to, internal lubricants, compatibilizing agents, release agents, plasticizers, ultraviolet stabilizers, catalyst neutralizers, combinations thereof, and blends thereof.

Exemplary internal lubricants include, but are not limited to, polyethylene glycol (PEG), polypropylene glycol (PPG), calcium stearate, and glycerol mono stearate (GMS).

Exemplary compatibilizing agents include, but are not limited to, titanium di(dioctylpyrophosphosate)oxyacetatc, di(dioctylpyrophosphosate) ethylene titanate, isopropyl tricumylphenyl titan ate, tetra(2,2 diallyloxymethyl)butyl, di(d-itridecyl)phosphio zirconate, and glycidoxypropyltrimethoxysilane.

Exemplary release agents include, but are not limited to, oleamide, stearamide, zinc stearate, erucamide, aminopropyltrimethoxysilane, bis(glycidoxypropyl)tetramethyldisiloxane, bis(3-(triethoxysilyl)propyl)-tetrasulfide, and bis(trimethylsilyl)urea.

Exemplary plasticizers include, but are not limited to, tri-isooctyl trimellitate, epoxidized soybean oil, di(2-ethylhexyl) adipate, acetyl triethyl citrate, acetyl tributyl citrate, diisocecyl adipate, triethyl citrate, polybutene, oleyl palitamide, n-stearyl erucamide, and distearyl thiodipropionate.

Exemplary ultraviolet stabilizers include, but are not limited to, 2-hydroxy-4-n-octoxybenzophenone, 2-hydroxy-4-methoxy-benzophenone, and sodium dicyclohexyl sulfosuccinate.

Exemplary catalyst neutralizers include, but are not limited to, metal stearates (such as calcium stearate), hydro talcites, calcium lactate, and metal oxides, and combinations thereof.

Compounds containing phosphorous in the +3 oxidation state may be added to the molecular melt in limited quantities that do not adversely react with the coupling agent.

The filler component may be an organic filler, or an inorganic filler. Exemplary inorganic fillers include, but are not limited to, talc, mica, wollastonite, calcium carbonate, natural and synthetic clays and organo modified derivatives thereof, silicates, and the like. Exemplary organic fillers include, but are not limited to, 1,3,5-benzene tri-carboxylic-(N-2-methylcyclohexyl)triamine and florinated aromatic triamines. The filler may be fibrous, granular, or powder form. Exemplary fibrous fillers include, but are not limited to, carbon fiber and whiskers, which fillers may have a form of cloth, mat, cut bundles, chopped fiber, filament, or whisker. Exemplary granular or powder fillers include, but are not limited to, talc, clay, mica, asbestos, graphite, carbon black, glass flake, glass beads, glass powder, montmorillonite, bentonite, kaolin, kieselguhr, dolomite, alumina, silica, titanium dioxide, magnesium oxide, tin oxide, aluminum hydroxide, magnesium hydroxide, basic magnesium carbonate, barium sulfate, calcium sulfite, magnesium carbonate, calcium carbonate, barium carbonate, calcium silicate, potassium titanate, magnesium sulfate, calcium sulfate, molybdenum sulfide, oxysulfate, silicon carbide, aluminum powder, metal powder, pumice powder, and pumice balloon. The polypropylene composition may comprise less than 50 percent by weight of the filler based on the weight of the polypropylene composition. All individual values and subranges less than 50 weight percent are included herein and disclosed herein; for example, polypropylene composition may comprise less than 40 percent by weight of the filler based on the weight of the polypropylene composition; or in the alternative, polypropylene composition may comprise 20 to 50 percent by weight of the filler based on the weight of the polypropylene composition.

A nucleating agent may also be incorporated into the polypropylene composition of the instant invention. A nucleating agent is a substance having a nucleating effect. Any conventionally known nucleating agent is acceptable so long as it promptly induces a crystalline nucleus without impairing physical properties of the high crystalline polypropylene and decreases a degree of supercooling required for initiation of crystallization. Examples of such a nucleating agent include, but are not limited to, high-melting-point polymers; organic carboxylic acid or its metal salts; aromatic sulfonate or its metal salts; organic phosphate compounds or their metal salts; dibenzylidenesorbitol or its derivatives; partial metal salts of rhodinic acid; inorganic particles; imides; amides; quinacridones; quinones; and mixtures thereof.

Examples of high-melting-point polymers serving as the nucleating agents include, but are not limited to, polyolefins such as polyethylene or polypropylene; polyvinylcycloalkanes such as polyvinylcyclohexane or polyvinylcyclopentane; poly(3-methylpentene-1); poly(3-methylbutene-1); and polyalkenylsilanes. Examples of metal salts serving as the nucleators include, but are not limited to, aluminum benzoate, aluminum p-t-butylbenzoate, sodium adipate, sodium thiophenecarboxylate, and sodium pyrrolecarboxylate.

Examples of inorganic microparticles serving as the nucleators include, but are not limited to, talc, clay, mica, asbestos, glass flake, glass beads, calcium silicate, montmorillonite, bentonite, graphite, aluminum powder, alumina, silica, kieselguhr, titanium oxide, magnesium oxide, pumice powder, pumice balloon, aluminum hydroxide, magnesium hydroxide, basic magnesium carbonate, dolomite, calcium sulfate, potassium titanate, barium sulfate, calcium sulfite, and molybdenum sulfide. These inorganic particles may be used singly or in combination of two or more species.

Metal salts of an organic phosphoric acid are also exemplary nucleating agents, which salts are represented by the formula (1), or (2) described below.

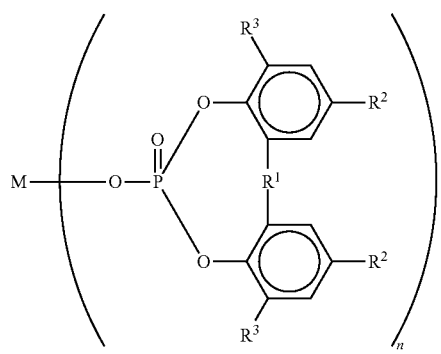

(1)

wherein $R^1$ represents oxygen, sulfur, a $C_1$—$C_{10}$ hydrocarbon group; each of $R^2$ and $R^3$, which may be identical to or different from each other, represents hydrogen or a $C_1$—$C_{10}$ hydrocarbon group; any two groups of $R^2$ and $R^3$ may link to form a cyclic structure; M represents a 1-3 valent metal atom; and n represents an integer between 1 and 3 inclusive. Specific examples thereof include, but are not limited to, sodium 2,2'-methylenebis(4,6-di-t-butylphenyl)phosphate, sodium 2,2'-ethylidenebis(4,6-di-t-butylphenyl)phosphate, lithium 2,2'-methylenebis(4,6-di-t-butylphenyl)phosphate, lithium 2,2'-ethylidenebis(4,6-di-t-butylphenyl)phosphate, sodium 2,2'-ethylidenebis(4-i-propyl-6-t-butylphenyl)phosphate, lithium 2,2'-methylenebis(4-methyl-6-t-butylphenyl)phosphate, lithium 2,2'-methylenebis(4-ethyl-6-t-butylphenyl)phosphate, calcium bis[2,2'-thiobis(4-methyl-6-t-butylphenyl)phosphate], calcium bis[2,2'-thiobis(4-ethyl-6-t-butylphenyl)phosphate], calcium bis[2,2'-thiobis(4,6-di-t-butylphenyl)phosphate], magnesium bis[2,2'-thiobis(4,6-di-t-butylphenyl)phosphate], magnesium bis[2,2'-thiobis(4-t-octylphenyl)phosphate], sodium 2,2'-butylidenebis(4,6-dimethylphenyl)phosphate, sodium 2,2'-butylidenebis(4,6-di-t-butylphenyl)phosphate, sodium 2,2'-t-octylmethylenebis(4,6-dimethylphenyl)phosphate, sodium 2,2'-t-octylmethylenebis(4,6-di-t-butylphenyl)phosphate, calcium bis[2,2'-methylenebis(4,6-di-t-butylphenyl)phosphate], magnesium bis[2,2'-methylenebis(4,6-di-t-butylphenyl)phosphate], barium bis[2,2'-methylenebis(4,6-di-t-butylphenyl)phosphate], sodium 2,2'-methylenebis(4-methyl-6-t-butylphenyl)phosphate, sodium 2,2'-methylenebis(4-ethyl-6-t-butylphenyl)phosphate, sodium (4,4'-dimethyl-5,6'-di-t-butyl-2,2'-biphenyl)phosphate, calcium bis[(4,4'-dimethyl-6,6-di-t-butyl-2,2'-biphenyl)phosphate], sodium 2,2'-ethylidenebis(4-N-butyl-6-t-butylphenyl)phosphate, sodium 2,2'-methylenebis(4,6-dimethylphenyl)phosphate, sodium 2,2'-methylenebis(4,6-diethylphenyl)phosphate, potassium 2,2'-ethylidenebis(4,6-di-t-butylphenyl)phosphate, calcium bis[2,2'-ethylidenebis(4,6-di-t-butylphenyl)phosphate], magnesium bis[2,2'-ethylidenebis(4,6-di-t-butylphenyl)phosphate], barium bis[2,2'-ethylidenebis(4,6-di-t-butylphenyl)phosphate], aluminum tris[2,2'-methylenebis(4,6-di-t-butylphenyl)phosphate], aluminum tris[2,2'-ethylidenebis(4,6-di-t-butylphenyl)phosphate], and a mixture containing 2 or more of the above compounds.

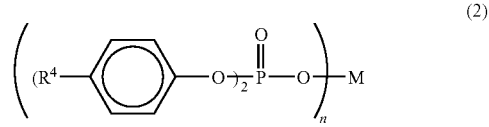

(2)

wherein $R^4$ represents hydrogen or a $C_1$—$C_{10}$ hydrocarbon group; M represents a 1-3 valent metal atom; and n represents an integer between 1 and 3 inclusive. Specific examples thereof include, but are not limited to, sodium bis(4-t-butylphenyl)phosphate, sodium bis(4-methylphenyl)phosphate, sodium bis(4-ethylphenyl)phosphate, sodium bis(4-i-propylphenyl)phosphate, sodium bis(4-t-octylphenyl)phosphate, potassium bis(4-t-butylphenyl)phosphate, calcium bis(4-t-butylphenyl)phosphate, magnesium bis(4-t-butylphenyl)phosphate, lithium bis(4-t-butylphenyl)phosphate, aluminum bis(4-t-butylphenyl)phosphate, and a mixture containing 2 or more of the above compounds.

Organic compounds which are also preferred as the nucleating agents are represented by the formula (3) described below:

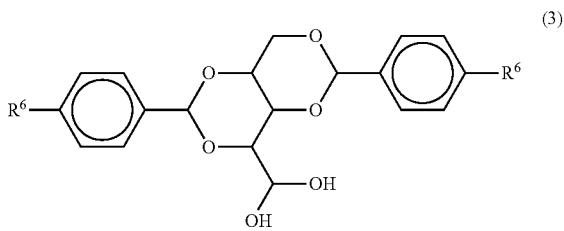

(3)

wherein $R^5$ represents hydrogen or a $C_1$—$C_{10}$ hydrocarbon group. Specific examples thereof include, but are not limited to, 1,3,2,4-dibenzylidenesorbitol, 1,3-benzylidene-2,4-p-methyl-benzylidenesorbitol, 1,3-benzylidene-2,4-p-ethyl-benzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene)

sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene)sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol, 1,3,2,4-di(p-chlorobenzylidene)sorbitol, and a mixture containing 2 or more of the above compounds.

Examples of other nucleating agents include metal salts of an aromatic or aliphatic carboxylic acid. For example, the nucleating agent may be aluminum benzoate, aluminum p-t-butylbenzoate, sodium adipate, sodium thiophenecarboxylate, and sodium pyrrolecarboxylate.

The above-described nucleating agents may be incorporated into high crystalline polypropylene in an amount in the range of 0.001 to 10 parts by weight, based on 100 parts by weight of the high crystalline polypropylene. All individual values and subranges from 0.001 to 10 parts by weight, based on 100 parts by weight of the high crystalline polypropylene are included herein and disclosed herein; for example, nucleating agents may be incorporated into the high crystalline polypropylene in an amount in the range of 0.1 to 3 parts by weight, based on 100 parts by weight of the high crystalline polypropylene.

One or more additives may also be incorporated in the polypropylene composition of the instant invention. Such additives include, but are not limited to, pigments, antioxidants, acid scavengers, ultraviolet absorbers, neutralizers, slip agents, antiblock agents, antistatic agents, waxes, flame retardants, processing aids, extrusion aids, and other additives within the skill in the art used in combination or alone. Effective amounts are known in the art and depend on parameters of the composition and conditions to which they are exposed.

The method of making a polypropylene composition according to instant invention includes the following steps: (1) reactive melt blending a high crystalline polypropylene having a crystallinity of at least 64 percent, an elastomer, and optionally a filler in the presence of a coupling agent; and (2) thereby producing the polypropylene composition having a melt flow rate in the range of less than 1 g/10 minutes measured at 230° C. under a load of 2.16 kg in accordance with ASTM-D 1238.

The coupling reaction is implemented via reactive melt blending. Reactive melt blending includes, but is not limited to, extrusion process or any other method which is capable of mixing the high crystalline polypropylene, the elastomer, and optionally a filler in the presence of the coupling agent, and adding sufficient energy to cause a coupling reaction at least between the coupling agent and the high crystalline polypropylene. The reactive blending process may be carried out in a single vessel such as a melt mixer, e.g. Barbender, Banbury, or Farrell Continuous Mixer, or a polymer extruder. The term extruder is intended to include its broadest meaning and includes such devices as a device which extrudes pellets as well as an extruder which produces sheet. An extruder which produces a multilayer sheet by coextrusion is also within the scope of the present invention.

In production, a high crystalline polypropylene, an elastomer, optionally a filler, and a coupling agent are introduced into a reaction vessel, for example an extruder, and reactive melt blended thereby forming the polypropylene composition of the instant invention. The molten polypropylene composition may be pelletized or may be formed into sheets directly. The high crystalline propylene, the elastomer, optionally the filler, and the coupling agent may be exposed to a temperature profile in range of about 50° C. to about 280° C. All individual values and subranges in the range of about 50° C. to about 280° C. are included herein and disclosed herein; for example, the high crystalline propylene, the elastomer, optionally the filler, and the coupling agent may be exposed to a temperature profile in range of about 160° C. to about 280° C.; or in the alternative, the high crystalline propylene, the elastomer, optionally the filler, and the coupling agent may be exposed to a temperature profile in range of about 220° C. to about 280° C.

In the alternative, high crystalline polypropylene, the elastomer, optionally the filler, and the coupling agent are introduced into a reaction vessel, for example an extruder having at least two zones capable of different temperature profiles into which a reaction mixture would pass, e.g. a first zone and a second zone. The first zone may advantageously be at a temperature of at least the higher softening temperature of either the high crystalline polypropylene or the elastomer and preferably less than the decomposition temperature of the coupling agent, and the second zone may advantageously be at a temperature, sometimes referred to as melt process temperature, sufficient for decomposition of the coupling agent. The high crystalline polypropylene, the elastomer, optionally the filler, and the coupling agent form a uniform blend in the first zone thereby facilitating the further reactive melt blending thereof in the second zone. The molten polypropylene composition may be pelletized or may be formed into sheets directly.

The sheets according to instant invention may comprise one or more layers wherein at least one layer comprises the polypropylene composition of the instant invention. The polypropylene composition of the instant invention may be formed into a single or multilayer sheet by any conventional process, for example by sheet extrusion. The thickness of the sheet is only limited by the equipment used to make it and form it into an article. However, the sheets of the present invention may have a thickness equal to or greater than about 0.5 mm. All individual values and subranges equal to or greater than about 0.5 mm are included herein and disclosed herein; for example, the sheets of the present invention may have a thickness equal to or greater than about 3 mm; or in the alternative, the sheets of the present invention may have a thickness in the range of 3 to 13 mm.

If the sheet of the instant invention comprises two or more layers, the polypropylene composition of the instant invention may comprise one or more of the layers. In other words, the polypropylene composition of the instant invention is the base layer and/or the cap layer and/or any layer between the base layer and the cap layer.

The articles according to instant invention include a polypropylene composition including the reactive melt blending product of a high crystalline polypropylene having a crystallinity of at least 64 percent, an elastomer, a coupling agent, and optionally a filler. Such articles include, but are not limited to, recreational vehicle, front ends, rear ends, and wheel wells, all terrain vehicle decks, kayaks, class 8 heavy truck wind fairings, and the like.

The formed article of the instant invention may be manufactured by thermoforming a sheet comprising the inventive polypropylene composition through the use of conventional machinery employing conventional conditions. There are a number of thermoforming techniques in use, but all are basically variations of two simple processes in which a heated sheet is moved by (1) air in the form of an applied vacuum and/or pressurized air, or (2) mechanical draw assists which force the sheet into a mold to produce the desired contoured or shaped article. In many cases the two processes are combined to result in a wide variety of procedures to make thermoformed articles. For example, thermoforming methods within the scope of the instant invention include, but are not limited to, straight forming, drape forming, snapback forming, reverse-draw forming, plug-assist forming, plug-assist/reverse draw forming, air-slip forming/plug-assist, air-slip forming, matched tool forming, twin-sheet forming, and the like.

The thermoforming process includes heating a sheet until it softens or starts to sag, after which one or more of vacuum, air pressure, and/or mechanical draw assist is applied and the heated sheet is drawn into a female mold, sometimes referred to as die, drawn over a male mold, or the two molds are used together to form an article, the formed article is cooled, removed from the mold, and trimmed as necessary.

The sheet temperature for thermoforming a sheet of the inventive polypropylene composition is less than or equal to about 190° C.; or in the alternative, less than or equal to about 180° C.; or in another alternative, less than or equal to about 175° C. Further, the sheet temperature for thermoforming a sheet of the inventive polypropylene composition is greater than or equal to about 160° C.; or in the alternative, greater than or equal to about 165° C.; or in another alternative, greater than or equal to about 170° C.

Adequate polymer melt strength is necessary for producing acceptable thermoformed articles, especially large articles with sections having a deep draw. The sheets made from the inventive polypropylene composition have a draw ratio of at least 1.5:1; or in the alternative, the sheets made from the inventive polypropylene composition have a draw ratio of at least 2:1.

In one embodiment, the instant invention is a polypropylene composition including the reactive melt blending product of a high crystalline polypropylene having a crystallinity of at least 64 percent, an elastomer, a coupling agent, and optionally a filler, wherein the polypropylene composition has a melt flow rate in the range of less than 1 g/10 minutes measured at 230° C. under a load of 2.16 kg in accordance with ASTM-D 1238.

In an alternative embodiment, referring to FIG. 1, the instant invention is a polypropylene composition including the reactive melt blending product of a high crystalline polypropylene having a crystallinity of at least 64 percent, at least 10 percent by weight of an elastomer based on the total weight of the polypropylene composition, 4,4'-diphenyl oxide bis-sulfonyl azide as a coupling agent, and optionally a filler, wherein the polypropylene composition has a melt flow rate equal to or less than $(-0.0032X+1.7868)$, where X being the amount of the 4,4'-diphenyl oxide bis-sulfonyl azide in ppm.

In an alternative embodiment, referring to FIG. 1, the instant invention is a polypropylene composition including the reactive melt blending product of a high crystalline polypropylene having a crystallinity of at least 64 percent, at least 50 percent by weight of an elastomer based on the total weight of the polypropylene composition, 4,4'-diphenyl oxide bis-sulfonyl azide as a coupling agent, and optionally a filler, wherein the polypropylene composition has a melt flow rate equal to or less than $(-0.0031X+1.5613)$, where X being the amount of the 4,4'-diphenyl oxide bis-sulfonyl azide in ppm.

In an alternative embodiment, referring to FIG. 1, the instant invention is a polypropylene composition including the reactive melt blending product of a high crystalline polypropylene having a crystallinity of at least 64 percent, at least 20 percent by weight of an elastomer based on the total weight of the polypropylene composition, 4,4'-diphenyl oxide bis-sulfonyl azide as a coupling agent, and optionally a filler, wherein the polypropylene composition has a melt flow rate equal to or less than $(-0.0019X+1.127)$, where X being the amount of the 4,4'-diphenyl oxide bis-sulfonyl azide in ppm.

Articles according to instant invention may be produced via different methods. Such methods are generally known to a person of skill in the art. Such methods include, but are not limited to, thermoforming, rotational molding, blow molding, and the like.

Test Methods

Test methods include the following:

Instrumented dart impact was determined according to ASTM-D 376.

Izod impact was determined according to ASTM-D 256.

Flexural modulus was determined according to ASTM-D 790A.

Melt flow rate was determined at 230° C. under a load of 2.16 kg according to ASTM-D 1238.

Melt index ($I_2$) was determined at 190° C. under a load of 2.16 kg according to ASTM D-1238-03.

Number of ductile breaks was determined according to the following procedure: The number of ductile breaks and brittle breaks was determined according to the following falling dart impact test. Flat test specimen were obtained by cutting extruded sheets. The samples were 80×80 mm with a thickness of approximately in range of 2-3 mm. The samples were impacted by a striker at a right angle to the plane of the sheet. Velocity on impact was set to 4.4+0.1 m/s, which was obtained with a drop height of 985 mm. For testing at non-ambient temperatures, the sample were stored in cold chambers for at least 2 hours. The samples were taken out one at a time, and test immediately and as quickly as possible, preferably within 5 seconds after removal from the temperature chamber.

Number of brittle breaks was determined according to the following procedure: The number of ductile breaks and brittle breaks was determined according to the following falling dart impact test. Flat test specimen were obtained by cutting extruded sheets. The samples were 80×80 mm with a thickness of approximately in range of 2-3 mm. The samples were impacted by a striker at a right angle to the plane of the sheet. Velocity on impact was set to 4.4+0.1 m/s, which was obtained with a drop height of 985 mm. For testing at non-ambient temperatures, the sample were stored in cold chambers for at least 2 hours. The samples were taken out one at a time, and test immediately and as quickly as possible, preferably within 5 seconds after removal from the temperature chamber.

Examples

The following examples illustrate the present invention but are not intended to limit the scope of the invention. The examples of the instant invention demonstrate that the polypropylene compositions in accordance with the present invention possess adequate processing properties such as high melt strength and improved end product properties such as stiffness and toughness, especially at low temperatures.

Formulation Components

ENR™ 7380 is an ethylene-butene copolymer, commercially available from The Dow Chemical Company, having a density of approximately 0.870 g/cm$^3$ determined according to ASTM-D 792, a melt index of <0.5 dg/min determined at 190° C. under a load of 2.16 kg according to ASTM-D 1238.

Inspire® D-207 is a high crystalline polypropylene homopolymer, available from The Dow Chemical Company, having a melt flow rate of approximately 2.1 g/10 minutes measured at 230° C. under a load of 2.16 kg according to ASTM-D 1238. Inspire® D-207 used in the instant invention also include the following additives: 830 ppm NA-11, 500 ppm I-1010, 750 I-168,and 400 ppm DHT4A, described in further detail herein below.

NA-11 is a nucleating agent, commercially available from Amfine Chemical Corp.

Irganox®1010 (3,5-di-tert-butyl-4-hydroxy hydrocinnamate) (I-1010) is a phenolic antioxidant, commercially available from Ciba Specialty Chemicals, Inc.

Irgafos® 168 (tris(2,4-ditert-butylphenyl) phosphate) (I-168) is a processing stabilizer, commercially available from Ciba Specialty Chemicals, Inc.

JETFIL 700C is a mineral talc, commercially available from Rio Tinto PLC, United Kingdom.

DHT4A is a stabilizer, commercially available from Kyowa Chemical Industry Co., Ltd.

4,4'-diphenyl oxide bis-sulfonyl azide (BSA) is a coupling agent, commercially available from Dynamit Nobel.

Reactive Melt Blending Process and Equipments

The reactive melt blending according to instant invention was achieved via a 2.5 inch Farrel CP-250 Continuous Mixer with 3 dams feeding into a single screw extruder and strand cutter. The mixer was equipped with #7/15 rotor, and the extruder was equipped with a 6 hole (3.5 mm hole diameter) strand die. The profile of the Farrel CP-250 Continuous Mixer is further disclosed in Table III.

In the reactive melt blending process, the formulation components listed in Table I were introduced into the Farrel CP-250 Continuous Mixer, and melt blended in the presence of each other thereby forming the inventive polypropylene composition, i.e. inventive examples E1-E8. The strands of molten polypropylene composition was further processed via a 16 inch water bath and a Berlyn air knife adapted for providing sufficient cooling and drying. The strands were chopped and pelletized via a Scheer SGS 100E pelletizer. The reactive melt blending conditions are shown in Table IV. Each inventive example (E1-E8) was tested for instrumented dart impact, izod impact, flexural modulus, melt flow rate, No. of ductile breaks, and No. of brittle breaks, and the results are shown in Table II.

Sheet Fabrication Process and Equipments

Sheet extrusion of the inventive polypropylene composition, i.e. inventive examples E1-E8, was accomplished on a multi position sheet line. The main sheet extrusion equipment included a 2.5 inch diameter HPM extruder having a 30:1 length to diameter ratio, a Maag Extrex® 36/36 gear pump, and a Camile TG Data Acquisition and Control System. The extruder included water cooling capabilities. The extruder further included cast bronze electrically operated heaters. The primary extruder included a high performance double wave screw. The primary extruder was operated with the vent closed. Beringer EA-20 screen changer was positioned downstream of the extruder thereby filtering impurities, increasing buck pressure on the extruder. A screen pack with a 40/60/80/125 mesh configuration was disposed within the screen changer. After the polymer melt was filtered, it was conveyed through a 25 inch long transfer line to a gear pump. The gear pump is a positive displacement device that eliminates extruder surges and delivers constant output rate thereby facilitating uniform sheet thickness. The primary extruder conveyed the molten polymer to a co-extrusion feed block, manufactured by Cloeren Corporation. The molten polymer was conveyed to a sheet extrusion die having a width of 26 inches. The extrusion sheet die included ten temperature control zones in the body. The extrusion rate was 200 lb/n. Temperature settings for the primary extruder, gear pump, transfer line, feed block co-extruder, and extrusion sheet die are further disclosed in Tables V, and VI.

Thermoforming Process and Equipments

Figure 5:
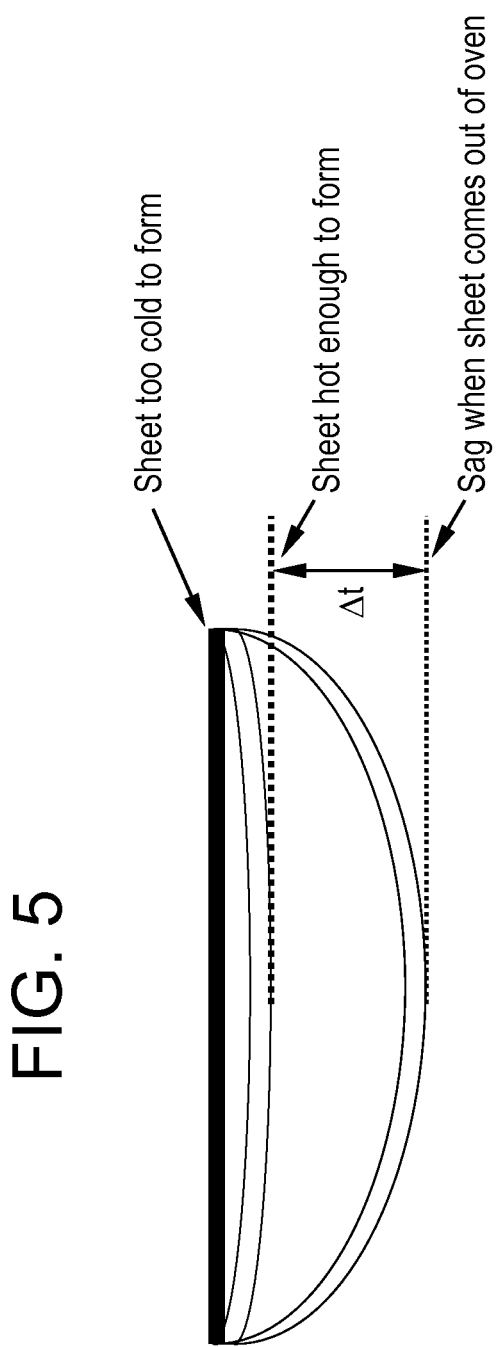
FIG. 5 is a schematic illustration of the sag of a sheet prepared according to instant invention.

The sheet samples were subsequently thermoformed on a ZMD International Model V223 shuttle thermoformer. Each sheet was placed in the clamp frame of the ZDM thermoformer, and rigidly clamped on all four sides. Next, the clamped sheet was indexed into the heat station of the ZMD thermoformer, where the sheet was heated by quartz infrared radiant heaters. The sheet was heated via infrared radiation. As the temperature of the sheet was increased, the initially flat sheet began to sag under its own weight as shown schematically in FIG. 5. The amount of sag is limited by the equipment configuration and ultimately on the final part quality.

The vertical distance of the sheet sag from the initial position in the clamp frame was measured using an infrared profiling scanner (light curtain) that was positioned to detect sheet sag at the middle of the oven. The time required for the sheet to sag from approximately 2.25 inches below its initial position to approximately 4.25 inches from its initial position was recorded. Sag rate was determined by dividing the change in the vertical distance of the sheet measured in the center by the time required for the change in height. The sheet was removed from the oven when the sag reached approximately 4.25 inches from its initial position, and then it was moved to the form station. The sheet surface temperature on the bottom side of the sheet was measured at the end of the heat cycle using an infrared pyrometer. Once the heated sheet was moved out of the oven and into the form station, a vacuum box contacted the sheet from below. Vacuum was applied to draw the sheet into the vacuum box and pre-stretch the sheet. A mold was lowered into the top of the pre-stretched sheet, and vacuum was applied to draw the extended sheet against the mold while simultaneously vacuum was released from the vacuum box. The part was formed, and it was allowed to cool. It was then removed from the clamp frame.

Results of the thermoforming evaluation are shown in Table VII. The heat time was the amount of time required for the sheet to sag 4.25 inches below the initial position from when the sheet entered the oven. Surface temperature was measured in the middle of the sheet on the bottom side using an infrared pyrometer once the sheet completes the heat cycle, and indexes from the oven into the form station. Sag time was the time required for the sheet to sag a chosen distance, in this case from 2.25 to 4.25. The sag rate was the vertical distance divided by the sag time.

The present invention may be embodied in other forms without departing from the spirit and the essential attributes thereof, and, accordingly, reference should be made to the appended claims, rather than to the foregoing specification, as indicating the scope of the invention.

TABLE I

| Example No. | HCPP-1 (Weight Percent) | ENR ™ 7380 (Weight Percent) | 4,4'-diphenyl oxide bis-sulfonyl azide (PPM) | JETFIL 700C (Weight Percent) |
| --- | --- | --- | --- | --- |
| E1 | 60 | 10 | None | 30 |
| E2 | ~60 | 10 | 200 | 30 |
| E3 | ~60 | 10 | 400 | 30 |
| E4 | 55 | 15 | None | 30 |
| E5 | ~55 | ~15 | 200 | 30 |
| E6 | ~55 | 15 | 400 | 30 |
| E7 | ~50 | 20 | 200 | 30 |
| E8 | ~50 | 20 | 400 | 30 |

TABLE II

| Example No. | Avg. Flexural Strength (psi) | Avg. Flexural Modulus (kpsi) | Avg. 1% Secant Modulus (kpsi) | Average MFR-I2-230° C. | Total Energy @ 23° C. (in-lb) | No. of Ductile Breaks @ 23° C. | No. of Brittle Breaks @ 23° C. | Total Energy @ 0° C. (in-lb) | No. of Ductile Breaks @ 0° C. | No. of Brittle Breaks @ 0° C. |
| --- | --- | --- | --- | --- | --- | --- | --- | --- | --- | --- |
| E1 | 6186 | 471 | 396 | 1.839 | 26.07 | 5 | 0 | 16.75 | 1 | 4 |
| E2 | 6131 | 490 | 411 | 0.89 | 32.85 | 5 | 0 | 18.6 | 1 | 4 |
| E3 | 5829 | 456 | 387 | 0.359 | 34.14 | 5 | 0 | 31.06 | 3 | 2 |
| E4 | 4952 | 387 | 331 | 0.748 | 34.16 | 5 | 0 | 44.21 | 5 | 0 |
| E5 | 5183 | 384 | 326 | 1.579 | 31.92 | 5 | 0 | 32.03 | 3 | 2 |
| E6 | 4974 | 384 | 329 | 0.977 | 31.71 | 5 | 0 | 42.95 | 5 | 0 |
| E7 | 6915 | 552 | 464 | 1.034 | 31.57 | 5 | 0 | 12.71 | 0 | 5 |
| E8 | 4804 | 369 | 315 | 0.369 | 30.96 | 5 | 0 | 38.24 | 5 | 0 |

TABLE III

| Mixer | Extruder |
| --- | --- |
| 3" Rotor | 4" Screw |
| 60 horsepower drive | 40 horsepower drive |
| 97 Armature amps (maximum) | 67 Armature amps (maximum) |
| 850 rpm (maximum) | 100 rpm (maximum) |
| Rotor style #7/15 | 11:1 L/D |

TABLE IV

| | Temperature (° C.) |
| --- | --- |
| Extruder zone 1 | 210 |
| Extruder zone 2 | 220 |
| Extruder zone 3 | 230 |
| Extruder zone 4 | 230 |
| Extruder zone 5 | 230 |
| Adapter | 230 |
| Screen changer | 230 |
| Transfer line zone 1 | 230 |
| Transfer line zone 2 | 230 |
| Transfer line zone 3 | 230 |
| Transfer line zone 4 | 230 |
| Pump inlet | 230 |
| Gear pump | 230 |
| Pump outlet | 230 |

TABLE V

| Die Temperature Settings | Temperature (° C.) |
| --- | --- |
| Feed Block | 230 |
| Die zone 1 | 245 |
| Die zone 2 | 235 |
| Die zone 3 | 230 |
| Die zone 4 | 235 |
| Die zone 5 | 245 |
| Die zone 6 | 245 |
| Die zone 7 | 235 |
| Die zone 8 | 230 |
| Die zone 9 | 235 |
| Die zone 10 | 245 |

TABLE VI

| Front Roll Temperature | 65° C. |
| --- | --- |
| Middle Roll Temperature | 92° C. |
| Back Roll Temperature | 104° C. |
| Front Roll Speed | 19 inch/minute |
| Middle Roll Speed | 19 inch/minute |
| Back Roll Speed | 19.2 inch/minute |

TABLE VII

| Example No. | CRI Ref. No. | Heat Time | Average Surface Temperature (° F.) | Surface Temperature Standard Deviation (° F.) | Average Sag Time (Second) | Average Sag Rate (Inch/Second) | Sag Rate Standard Deviation (Inch/Second) | Comments |
|---|---|---|---|---|---|---|---|---|
| E1 | 2605 | 221 | 349 | 3.8 | 31 | 0.085 | 0.019 | Variation in sag, some holes, thinning |
| E2 | 2608 | 211 | 356 | 2.5 | 21 | 0.100 | 0.018 | High sag rate, no holes |
| E3 | 2611 | 201 | 366 | 2.1 | 59 | 0.034 | 0.002 | Good parts with correct bubble size |
| E4 | 2610 | 199 | 351 | 0.8 | 52 | 0.049 | 0.007 | Some holes, thinning |
| E5 | 2606 | 214 | 358 | 2.2 | 61 | 0.037 | 0.005 | Small holes, thinning, |
| E6 | 2609 | 217 | 370 | 2.0 | 33 | 0.061 | 0.004 | Good parts with correct bubble size |
| E7 | 2607 | 201 | 359 | 1.9 | 28 | 0.074 | 0.013 | Tearing, holes |
| E8 | 2613 | 204 | 370 | 2.4 | 43 | 0.048 | 0.009 | Holes on almost all parts |

We claim:

1. A polypropylene composition comprising the reactive melt blending product of:
   less than 90 percent by weight of a high crystalline polypropylene having a melt flow rate of less than 5 g/10 minutes measured at 230° C. under a load of 2.16 kg according to ASTM-D 1238 and a crystallinity of at least 64 percent;
   from 10 to 20 percent by weight of an ethylene based elastomer having a density in the range of 0.855 to 0.890 g/cm$^3$ and a melt index in the range of 0.1 to 10 g/10 minutes measured at 190° C. under a load of 2.16 kg according to ASTM-D 1238, based on the weight of the propylene composition;
   from 400 to 800 parts by weight of a coupling agent per one million parts of the propylene composition; and
   from 20 to 50 percent by weight of a filler, based on the weight of the propylene composition;
   wherein said polypropylene composition having a melt flow rate in the range of from 0.25 to 0.65 g/10 minutes measured at 230° C. under a load of 2.16 kg according to ASTM-D 1238 and a flexural modulus of at least 350,000 psi, as measured in accordance with ASTM-D 790A.

2. The polypropylene composition according to claim 1, wherein said elastomer is an ethylene/α-olefin copolymer selected from the group consisting of 1-butene, 1-hexene, 1-heptene, and 1-octene.

3. The polypropylene composition according to claim 1, wherein said filler being an organic filler or inorganic filler selected from the group consisting of talc, mica, wollastonite, calcium carbonate, natural and synthetic clays and organo modified derivatives thereof, and silicates.

4. The polypropylene composition of claim 1, wherein said coupling agent is selected from the group consisting of 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), oxy-bis(4-sulfonylazidobenzene), 2,7-naphthalene bis(sulfonyl azido), 4,4'-bis(sulfonyl azido) iphenyl, 4,4'-diphenyl ether bis(sulfonyl azide), bis(4-sulfonyl azidophenyl)methane, and mixtures thereof.

5. The polypropylene composition according to claim 1, wherein said polypropylene composition further including a nucleating agent.

6. A method of producing a polypropylene composition comprising the steps of:
   reactive melt blending less than 90 percent by weight of a high crystalline polypropylene having a melt flow rate of less than 5 g/10 minutes measured at 230° C. under a load of 2.16 kg according to ASTM-D 1238 and a crystallinity of at least 64 percent, from 10 to 20 percent by weight of an ethylene based elastomer having a density in the range of 0.855 to 0.890 g/cm$^3$ and a melt index in the range of 0.1 to 10 g/10 minutes measured at 190° C. under a load of 2.16 kg according to ASTM-D 1238, based on the weight of the propylene composition, and from 20 to 50 percent by weight of a filler, based on the weight of the propylene composition, in the presence of from 400 to 800 parts by weight of a coupling agent per one million parts of the propylene composition; and
   thereby producing said polypropylene composition having a melt flow rate in the range from 0.25 to 0.65 g/10 minutes measured at 230° C. under a load of 2.16 kg according to ASTM-D 1238 and a flexural modulus of at least 350,000 psi. as measured in accordance with ASTM-D 790A.

7. A method of improving thermoformability of a polypropylene composition comprising the steps of:
   reactive melt blending less than 90 percent by weight of a high crystalline polypropylene having a melt flow rate of less than 5 g/10 minutes measured at 230° C. under a load of 2.16 kg according to ASTM-D 1238 and a crystallinity of at least 64 percent, from 10 to 20 percent by weight of an ethylene based elastomer having a density in the range of 0.855 to 0.890g/cm$^3$ and a melt index in the range of 0.1 to 10 g/10 minutes measured at 190° C. under a load of 2.16 kg according to ASTM-D 1238, based on the weight of the propylene composition, and from 20 to 50 percent by weight of a filler, based on the weight of the propylene composition, in the presence of from 400 to 800 parts by weight of a coupling agent per one million parts of the propylene composition; and
   thereby producing an improved thermoformable polypropylene composition having a melt flow rate in the range of from 0.25 to 0.65 g/10 minutes measured at 230° C. under a load of 2.16 kg according to ASTM-D 1238 and a flexural modulus of at least 350,000 psi, as measured in accordance with ASTM-D 790A.

8. A method of improving blow molding process of a polypropylene composition comprising the steps of:
   reactive melt blending less than 90 percent by weight of a high crystalline polypropylene having a melt flow rate of less than 5 g/10 minutes measured at 230° C. under a load of 2.16 kg according to ASTM-D 1238 and a crystallinity of at least 64 percent, from 10 to 20 percent by weight of an ethylene based elastomer having a density in the range of 0.855 to 0.890 g/cm³ and a melt index in the range of 0.1 to 10 g/10 minutes measured at 190° C. under a load of 2.16 kg according to ASTM-D 1238, based on the weight of the propylene composition, and from 20 to 50 percent by weight of a filler, based on the weight of the propylene composition, in the presence of from 400 to 800 parts by weight of a coupling agent per one million parts of the propylene composition; and thereby producing an improved polypropylene composition having a melt flow rate in the range of from 0.25 to 0.65 g/10 minutes measured at 230° C. under a load of 2.16 kg according to ASTM-D 1238 and a flexural modulus of at least 350,000 psi, as measured in accordance with ASTM-D 790A.

9. A method of improving rotational molding process of a polypropylene composition comprising the steps of:

reactive melt blending less than 90 percent by weight of a high crystalline polypropylene having a melt flow rate of less than 5 g/10 minutes measured at 230° C. under a load of 2.16 kg according to ASTM-D 1238 and a crystallinity of at least 64 percent, from 10 to 20 percent by weight of an ethylene based elastomer having a density in the range of 0.855 to 0.890 g/cm³ and a melt index in the range of 0.1 to 10 g/10 minutes measured at 190° C. under a load of 2.16 kg according to ASTM-D 1238, based on the weight of the propylene composition, and from 20 to 50 percent by weight of a filler, based on the weight of the propylene composition, in the presence of from 400 to 800 parts by weight of a coupling agent per one million parts of the propylene composition; and thereby producing an improved polypropylene composition having a melt flow rate in the range of from 0.25 to 0.65 g/10 minutes measured at 230° C. under a load of 2.16 kg according to ASTM-D 1238 and a flexural modulus of at least 350,000 psi, as measured in accordance with ASTM-D 790A.

10. An article comprising:

a polypropylene composition comprising the reactive melt blending product of:

less than 90 percent by weight of a high crystalline polypropylene having a melt flow rate of less than 5 g/10 minutes measured at 230° C. under a load of 2.16 kg according to ASTM-D 1238 and a crystallinity of at least 64 percent;

from 10 to 20 percent by weight of an ethylene based elastomer having a density in the range of 0.855 to 0.890 g/cm³ and a melt index in the range of 0.1 to 10 g/10 minutes measured at 190° C. under a load of 2.16 kg according to ASTM-D 1238, based on the weight of the propylene composition;

from 400 to 800 parts by weight of a coupling agent per one million parts of the propylene composition; and from 20 to 50 percent by weight of a filler, based on the weight of the propylene composition;

wherein said polypropylene composition having a melt flow rate in the range of from 0.25 to 0.65 g/10 minutes measured at 230° C. under a load of 2.16 kg according to ASTM-D 1238 and a flexural modulus of at least 350,000 psi, as measured in accordance with ASTM-D 790A.

11. A method of making an article comprising the steps of:

reactive melt blending less than 90 percent by weight of a high crystalline polypropylene having a melt flow rate of less than 5 g/10 minutes measured at 230° C. under a load of 2.16 kg according to ASTM-D 1238 and a crystallinity of at least 64 percent, from 10 to 20 percent by weight of an ethylene based elastomer having a density in the range of 0.855 to 0.890 g/cm³ and a melt index in the range of 0.1 to 10 g/10 minutes measured at 190° C. under a load of 2.16 kg according to ASTM-D 1238, based on the weight of the propylene composition, and from 20 to 50 percent by weight of a filler, based on the weight of the propylene composition, in the presence of from 400 to 800 parts by weight of a coupling agent per one million parts of the propylene composition; and thereby producing a polypropylene composition having a melt flow rate in the range of from 0.25 to 0.65 g/10 minutes measured at 230° C. under a load of 2.16 kg according to ASTM-D 1238 and a flexural modulus of at least 350,000 psi, as measured in accordance with ASTM-D 790A; and forming said polypropylene composition into an article.

* * * * *